(12) United States Patent
Shangguan et al.

(10) Patent No.: US 12,370,502 B2
(45) Date of Patent: Jul. 29, 2025

(54) CARBON DIOXIDE SEPARATION MEMBRANES AND PROCESS

(71) Applicant: Compact Membrane Systems, Inc., New Castle, DE (US)

(72) Inventors: Ning Shangguan, Cherry Hill, NJ (US); Stuart Marshall Nemser, Wilmington, DE (US); Sudipto Majumdar, Newark, DE (US); Andrew Edward Feiring, Wilmington, DE (US)

(73) Assignee: Compact Membrane Systems, Inc., New Castle, DE (US)

( * ) Notice: Subject to any disclaimer, the term of this patent is extended or adjusted under 35 U.S.C. 154(b) by 573 days.

(21) Appl. No.: 17/042,410

(22) PCT Filed: Mar. 28, 2019

(86) PCT No.: PCT/US2019/024517
§ 371 (c)(1),
(2) Date: Sep. 28, 2020

(87) PCT Pub. No.: WO2019/191388
PCT Pub. Date: Oct. 3, 2019

(65) Prior Publication Data
US 2021/0016231 A1  Jan. 21, 2021

Related U.S. Application Data

(60) Provisional application No. 62/737,703, filed on Sep. 27, 2018, provisional application No. 62/649,780, filed on Mar. 29, 2018.

(51) Int. Cl.
*B01D 53/22* (2006.01)
*B01D 69/10* (2006.01)
(Continued)

(52) U.S. Cl.
CPC ........... *B01D 69/12* (2013.01); *B01D 53/228* (2013.01); *B01D 69/1071* (2022.08); *B01D 71/36* (2013.01)

(58) Field of Classification Search
CPC ........ B01D 71/36; B01D 69/10; B01D 69/12; B01D 53/228
See application file for complete search history.

(56) References Cited

U.S. PATENT DOCUMENTS 1,678,311 A * 7/1928 Adams .................... B03D 1/012
209/901
2,230,556 A * 2/1941 Zimmer ............. C10M 171/004
516/41

(Continued)

FOREIGN PATENT DOCUMENTS

JP  S62-237923 A  10/1987
JP  H04-505881 A  10/1992
(Continued)

OTHER PUBLICATIONS

Japanese Search Report for JP 2020-552274.
(Continued)

*Primary Examiner* — Anthony R Shumate
(74) *Attorney, Agent, or Firm* — Seed IP Law Group LLP

(57) ABSTRACT

This invention discloses a thin-film composite membrane and process for the separation of carbon dioxide from non-hydrophilic gases such as methane, hydrogen, and nitrogen. The thin-film composite membrane has a gas-separation layer and a nonporous high-diffusion-rate layer, and has carbon dioxide to non-hydrophilic gas selectivity that is greater than the intrinsic selectivity of the gas-separation layer alone.

13 Claims, 1 Drawing Sheet

(51) Int. Cl.
  *B01D 69/12* (2006.01)
  *B01D 71/36* (2006.01)

(56) References Cited

U.S. PATENT DOCUMENTS

| | | | | |
|---|---|---|---|---|
| 2,503,279 | A * | 4/1950 | Lockwood | C07C 309/00 |
| | | | | 562/828 |
| 4,666,438 | A | 5/1987 | Raulerson | |
| 4,666,468 | A * | 5/1987 | Wu | B01D 53/228 |
| | | | | 95/47 |
| 5,342,432 | A | 8/1994 | Haubs et al. | |
| 2006/0073370 | A1* | 4/2006 | Krusic | C08J 5/2237 |
| | | | | 423/445 B |
| 2011/0168626 | A1* | 7/2011 | Tanaka | B01D 71/381 |
| | | | | 427/244 |
| 2016/0236141 | A1 | 8/2016 | Merkel et al. | |
| 2017/0056839 | A1 | 3/2017 | Ho et al. | |

FOREIGN PATENT DOCUMENTS

| | | | | |
|---|---|---|---|---|
| WO | WO 2012-167366 | A1 | 12/2012 | |
| WO | WO 2013-185739 | A1 | 12/2013 | |
| WO | WO-2014089708 | A1 * | 6/2014 | B82Y 30/00 |
| WO | WO 2016/182887 | A1 | 11/2016 | |
| WO | WO 2016-201222 | A1 | 12/2016 | |
| WO | WO 2017-004496 | A1 | 1/2017 | |

OTHER PUBLICATIONS

International Search Report for PCT/US2019/024517.
Japanese Office Action for JP 2020-552274.
Baker et al., "Gas Separation Membrane Materials: A Perspective," *Macromolecules* 47:6999-7013, Sep. 2014. (15 pages).
Baschetti et al., "Gas permeation in perflurosulfonated membranes: Influence of temperature and relative humidity," *International Journal of Hydrogen Energy* 38:11973-11982, Jul. 2013. (10 pages).
Jeon et al., "Gas Membranes for CO2/CH4 (Biogas) Separation: A Review," *Environmental Engineering Science* 32(2):71-85, Jan. 2015. (16 pages).
Olivieri et al., "Humid permeation of $CO_2$ and hydrocarbons in Aquivion® perfluorosulfonic acid ionomer membranes, experimental and modeling," *Journal of Membrane Science* 542:367-377, Nov. 2017. (11 pages).
Pinnau et al., "Gas Permeation Through Composite Membranes," *Journal of Membrane Science* 37:81-88, Apr. 1988. (8 pages).
Robeson, "The upper bound revisited," *Journal of Membrane Science* 320:390-400, Apr. 2008. (11 pages).
Selyanchyn et al., "Thickness Effect on $CO_2/N_2$ Separation in Double Layer Pebax-1657®/PDMS Membranes," *Membranes* 8:121, Dec. 2018. (13 pages).
Selyanchyn et al., "Membrane thinning for efficient $CO_2$ capture," *Science and Technology of Advanced Materials* 18(1):816-827, Oct. 2017. (12 pages).
Wu et al., "Preparation and gas permeation of crown ether-containing co-polyimide with enhanced $CO_2$ selectivity," *Journal of Membrane Science* 551:191-203, Apr. 2018. (13 pages).
Karode et al., "Analysis of transport through thin film composite membranes using an improved Wheatstone bridge resistance model", 1997, Journal of Membrane Science 127, pp. 131-140.
Selyanchyn et al., "Thickness Effect on CO2/N2 Separation in Double Layer Pebax-1657®/PDMS Membranes", Dec. 2018, Membranes, 8, 121, pp. 1-13.

* cited by examiner

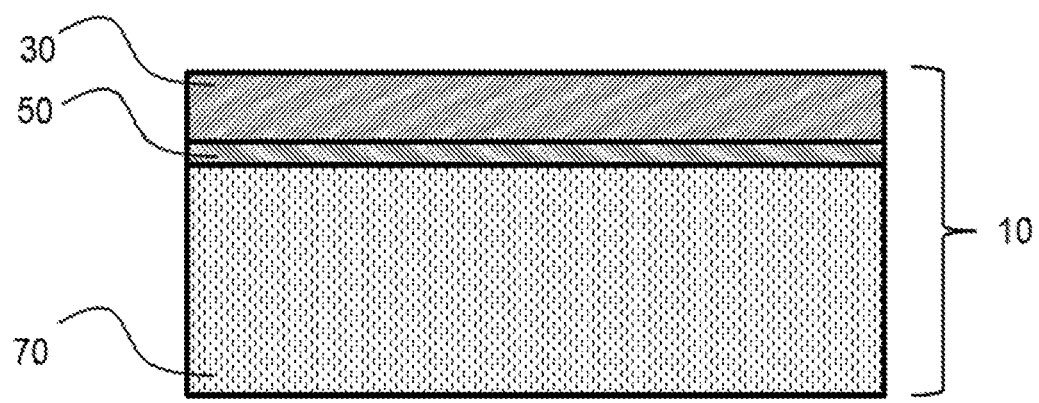

CARBON DIOXIDE SEPARATION MEMBRANES AND PROCESS

CROSS REFERENCE TO RELATED APPLICATIONS

This application claims priority to U.S. Provisional Patent Application No. 62/649,780, filed on Mar. 29, 2018, and to U.S. Provisional Patent Application No. 62/737,703, filed on Sep. 27, 2018, the disclosures of which are incorporated by reference herein in their entirety.

GOVERNMENT RIGHTS

This invention was made with government support under USDA 2016-33610-25490 and USDA-2017-33610-27019 awarded by the Department of Agriculture. The government has certain rights in the invention.

FIELD OF THE INVENTION

This invention discloses a thin-film composite membrane and process for the separation of carbon dioxide from non-hydrophilic gaseous species such as methane, hydrogen, and nitrogen.

BACKGROUND OF THE INVENTION

Energy production from processes such as electrical power plants, which burn natural gas, coal, or other petroleum based products, or "biogas" generation from biological degradation of waste materials such as manure, produce gaseous effluents comprising carbon dioxide ($CO_2$). In power plants, the effluent (flue gas) contains $CO_2$ (generally 12-15% v/v), nitrogen (from the combustion air), and water vapor, whereas biogas contains methane, $CO_2$, hydrogen sulfide, and water vapor. Biomethane that is separated from other components can be used as an energy source. However, atmospheric $CO_2$ emissions are also a source of global warming and it is desirable, especially in electrical power generation, to reduce these emissions.

Carbon dioxide capture and sequestration (CCS) has been proposed in which the gas is captured, compressed, and injected into underground storage sites. The overall CCS process needs to be highly efficient to minimize costs and the incurred energy penalty since both processes produce $CO_2$-containing effluents at low pressure, often close to atmospheric pressure (~15-pisa), making separation economically challenging. For example, amine scrubbing is a known low-pressure separation process in which an ammonium-$CO_2$ complex is formed and then removed from the gas stream. However, it is disadvantaged due to the subsequent energy required to separate the $CO_2$ from the complex and regenerate the amine.

Polymeric membranes have also been investigated for $CO_2$ separations. See for example Jean et al. in "Gas Membranes for $CO_2/CH_4$ (Biogas) Separation: A Review," *Environmental Engineering Science* 2015 32 71-86, and Wu et al. "Preparation and gas permeability of crown ether-containing co-polyimides with enhanced $CO_2$ selectivity," *Journal of Membrane Science* 2018 551 191-203. Many $CO_2$-separation membranes that had acceptable selectivity such as those based on polyimide, polysulfone, and cellulose acetate polymers had low $CO_2$ permeance (i.e. pressure-normalized flux) of approximately 100 gas permeation units (GPU) and required a high feed gas pressure (>100-psig) and/or large membrane areas to achieve commercially acceptable gas fluxes. However, it is highly preferable to not compress the feed gas in order to minimize energy costs. Membrane materials should be thermally stable and chemically resistant to the components of the gas mixture, including minor components, which may be present as contaminants. Membrane materials should also be mechanically robust, and easy to fabricate into large area films.

Most nonporous membrane separations are solution-diffusion based and permeance at high or low-pressure operation conditions is similar. Selyanchyn and Fujikawa in "Membrane thinning for efficient $CO_2$ capture," *Science and Technology of Advanced Materials* 2017 18(1) 816-837, noted that an optimal membrane for an industrial $CO_2/N_2$ separation should possess a $CO_2$ permeance of at least 1000-GPU and selectivity over nitrogen of at least 20. Therefore, membranes with both high permeability (i.e. pressure and thickness-normalized flux) and selectivity would be desirable. However, there tends to be a tradeoff between permeability and selectivity. That is, membrane materials with high permeability tend to have low selectivity and vice versa. This situation is well known in the field of membrane technology and was characterized by the Robeson plot of selectivity versus permeability (Robeson, L. M., "The Upper Bound Revisited," *Journal of Membrane Science* 2008 320 390-400).

Intuitively, a very thin membrane of a material having high selectivity should also have a high permeance. Baker et al. in "Gas separation membrane materials," *Macromolecules* 2014 47 6999-7013, noted that the properties of thin membranes were very different from thick films. Most new membrane materials were evaluated as monolithic, relatively thick (50 to 150-μm) films, but industrial membranes were usually multi-layer membrane composites having gas-separation layer thicknesses that were 0.1-1.0-μm. For example, Pinnsu et al. in "Gas permeation through composite membranes," *Journal of Membrane Science* 1988 37 81-88, found that a composite membrane comprising a silicone-rubber gas-separation layer laminated to a porous polysulfone support could not achieve the intrinsic $CO_2/N_2$ selectivity of the silicone rubber material if the separation layer thickness was less than 2-μm. Furthermore, Selyanchyn et al. in "Thickness Effect on $CO_2/N_2$ Separation in Double Layer Pebax-1657®/PDMS Membranes," *Membranes* 2018 8 121, used a classical resistance in series model to predict the effect on the selectivity with variation of the thickness ratio of a poly(dimethylsiloxane) (PDMS) support (gutter) layer to Pebax-1657® gas-separation layer. Their model correlated with experimental permeance and selectivity data for separation of carbon dioxide from nitrogen that showed lower composite $CO_2/N_2$ selectivity that approached but did not exceed the intrinsic selectivity of the gas-separation layer as the ratio decreased.

Highly fluorinated polymer materials such as Aquivion® (Solvay, Houston Tex.) and Nafion® (Chemours, Wilmington Del.) were noted for their excellent chemical, thermal, and mechanical stability. These and similar materials are ionomers that are also hydrophilic. They are known to be phase separated at a molecular scale with distinct fluorocarbon and ionic domains that are connected by channels. The ionic domains are known to contain liquid water under humid or humidified conditions. While not wanting to be bound by theory, it is believed that $CO_2$ solution-diffusion mainly occurs and was facilitated through the water in the ionic domains of these materials. Carbon dioxide is relatively hydrophilic and has an appreciable solubility in water.

Many other gases like methane, ethane, hydrogen, and nitrogen are relatively non-hydrophilic and have much lower solubility in water.

Single gas permeation of $CO_2$, $N_2$, methane ($CH_4$), and other non-hydrophilic gases was previously measured for Aquivion® thick films (≥120-μm) at 25° C. under humidified (≥75% relative humidity) conditions. See for example Baschetti et al. in "Gas permeation in perfluorosulfonated membranes: Influence of temperature and relative humidity," *International Journal of Hydrogen Energy* 2013 38 11973-11982, and Olivieri et al. in "Humid permeation of $CO_2$ and hydrocarbons in Aquivion® perfluorosulfonic acid ionomer membranes, experimental and modeling," *Journal of Membrane Science*, 2017 542 367-377. The $CO_2$ permeance was approximately 1.7-GPU (permeability of approximately 200 Barrer) with $CO_2/N_2$ and $CO_2/CH_4$ intrinsic selectivities that were approximately 35 and 30, respectively.

SUMMARY OF THE INVENTION

This invention discloses a thin-film composite membrane and a process for separating a gaseous composition comprising carbon dioxide and a non-hydrophilic gas using the membrane, the process comprising the following steps of:
a. providing a thin-film composite membrane, having a feed side and a permeate side, the membrane comprising;
   i. a porous-layer support, and;
   ii. a nonporous high-diffusion rate layer; said high-diffusion rate layer is coplanar and in direct contact with said porous-layer support, and;
   iii. a nonporous and hydrophilic gas-separation layer; said gas-separation layer is coplanar and in direct contact with said high-diffusion rate layer, and;
b. exposing the membrane feed-side to a flowing composition comprising carbon dioxide and a non-hydrophilic gas;
c. providing a driving force and producing a composition on the permeate side having a higher ratio of carbon dioxide to non-hydrophilic gas than the feed side, and;
wherein the thin-film composite membrane has a carbon dioxide permeance of at least 500-GPU and a carbon dioxide to non-hydrophilic gas selectivity that is greater than the intrinsic selectivity of the gas-separation layer.

The thin-film composite membrane of the invention herein has a carbon dioxide permeance that is at least $(500 \times 10^{-6}) \times cm^3$ (STP)/$cm^2$/sec/cmHg (500 gas permeation units or 500-GPU), and preferably at least 1000-GPU at ambient (20 to 25° C.) temperatures. This commercially attractive performance is realized at operating conditions that include low feed pressures that are 45-psia or lower, and/or low $CO_2$ partial pressures that are 50% or less of total feed pressure. The composite membrane comprises a nonporous and hydrophilic gas-separation layer, having a thickness that is preferably less than 1-μm. The gas-separation layer is coplanar and in direct contact with a high-diffusion rate layer, also known as a gutter layer in the field of membrane technology. The high-diffusion rate layer is also nonporous and helps to facilitate the high $CO_2$ permeance. The $CO_2$ permeance of the high-diffusion rate layer is greater than the gas-separation layer and is preferably at least 5000 GPU and more preferably at least 10 times higher than the gas-separation layer. The high-diffusion rate layer is also coplanar and in direct contact to a porous-layer support, which provides mechanical strength and durability to the composite membrane as whole.

Herein, it was discovered that the combination of a nonporous high-diffusion rate layer and a nonporous and hydrophilic separation layer resulted in $CO_2$ selectivity that was greater than the intrinsic selectivity of the gas-separation layer alone. For example, the $CO_2/N_2$ and $CO_2/CH_4$ intrinsic selectivity for Aquivion® thick monolithic films was previously reported to be approximately 35 and 30, respectively, at 25° C. under humidified (≥75% RH) conditions. The $CO_2/N_2$ and $CO_2/CH_4$ selectivity herein for thin-film composite membranes comprising a gas-separation layer of Aquivion® were at least 35 and 30, respectively, and approximately 20% and 57% greater on average, respectively, under similar temperature and humidity testing conditions.

This summary of the invention introduces some of the embodiments of the invention, and is not intended to be limiting. Additional embodiments including variations and alternative configurations of the invention are further described in the detailed description of the invention and examples.

BRIEF DESCRIPTION OF THE DRAWING

The accompanying FIG. 1 is included to provide a further understanding of the invention, is incorporated in, and constitutes a part of this specification. FIG. 1 illustrates embodiments of the invention and together with the description serve to explain the principles of the invention. FIG. 1 shows a cross-sectional view of an exemplary high-permeance and high-selectivity thin-film composite membrane 10 comprising a nonporous gas-separation layer 30, nonporous high-diffusion-rate layer 50, and a porous-layer support 70. The layer surfaces are coplanar and in direct contact to each other. This may also be referred to as laminated or bonded together in the field of membrane technology although usually no separate adhesive is employed.

Corresponding reference characters indicate corresponding parts throughout the view of the FIGURE and are not to be construed as limiting the scope of the invention in any manner. Furthermore, FIG. 1 is not necessarily to scale; some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. In addition, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention. Certain additional terms are also used and some of them are further defined within the following detailed description of the invention:

Ionomers are useful materials for fabrication of the gas-separation layer of the thin-film composite membrane of the invention. An ionomer is a copolymer that comprises covalently bound ionic groups such as sulfonic acid, sulfonate, carboxylic acid, carboxylate, phosphate, phosphonium, or ammonium. Ionic groups may be hydrophilic and sulfonic acid or sulfonate salts are preferred ionic groups and the ionomer equivalent weight is the weight of ionomer containing one mole of ionic group. The ionomer equivalent weight is preferably less than 5000 grams per mole, more preferably less than 2000, and very preferably between 500 and 1000-g/mole. Preferred ionomers are fluoropolymers that comprise repeat units A and B in which A is a polymerized derivative of a fluorinated monomer and B contains hydrophilic ionic groups. Especially preferred ionomers are fluoropolymers in which there are no carbon-hydrogen groups in the polymer-backbone repeating units. Examples of the latter ionomers are well known in the art and include copolymers comprising repeat units of a perfluorovinyl ether, having a pendant sulfonate group, such as for example Nafion® (Chemours, Wilmington, DE) or Aquivion® (Solvay, Houston, TX).

Solution casting is a preferred film forming technique to fabricate the gas-separation layer of the composite membrane. Therein, a dilute solution of the ionomer is first prepared at concentrations that are preferably less than 5%, more preferably less than 2%, and very preferably between 0.1% and 1%. Suitable solvents or solvent mixtures are those that will dissolve the ionomer and evaporate at an appropriate rate to form the gas-separation layer in a timely manner. Residual or trace solvent remaining in the gas-separation layer should not interfere with subsequent processing steps. For example, suitable solvents include but are not limited to lower alcohols such as ethanol, isopropanol, n-propanol, certain ketone, ether, amide, and ester solvents, and mixtures therefrom. Certain mixtures of the preceding solvents with fluorinated solvents such as Novec® HFE7200, and HFE7300 are also suitable.

Preferred casting techniques for the ionomer solution include but are not limited to ring casting, dip-coating, spin-coating, slot-die coating, and Mayer rod coating. The solution is cast and the solvent(s) are evaporated to form the "dry" gas-separation layer. The gas-separation layer thickness has a significant influence on the membrane permeance and cost. The gas-separation layer is thin and preferably has a thickness of 0.01-μm to 1.0-μm, more preferably 0.05-μm to 0.5-μm. The gas-separation layer may be fabricated by casting directly onto a substrate comprising a high-diffusion rate layer. The high-diffusion rate layer also enables fabrication of the thin gas-separation layer by preventing the ionomer solution from penetrating into additional layers such as a porous-layer support.

Preferred materials for a high-diffusion rate layer include copolymers comprising repeat units from perfluoro-2,2-trifluoromethyl-1,3-dioxole (PDD), particularly if it is a component of a perfluoropolymer. In general, high molar percentages of PDD are desirable and consistent with being able to process the copolymers into a high-diffusion rate layer. In any PDD copolymer material, it is preferred that at least about 50 mole percent of the total repeat units are derived from PDD, more preferably at least 80 mole percent. These materials may also comprise functional groups that include perfluoroether, ester, carboxylate, and chloro. Very preferred copolymers comprise PDD with tetrafluoroethylene, available as Teflon® AF (The Chemours Co., Wilmington, DE) and for further information about Teflon® AF, see P. R. Resnick et al. in "Teflon® AF Amorphous Fluoropolymers," J. Schiers, Ed., *Modern Fluoropolymers*, John Wiley & Sons, New York 1997 397-420, which is hereby incorporated by reference. A preferred grade of Teflon® AF is AF 2400, which is reported to contain 83 mole percent PDD and 17 percent tetrafluoroethylene.

The high-diffusion rate layer of the invention may also be fabricated by solution casting and preferred casting techniques include but are not limited to ring casting, dip coating, spin-coating, slot-die coating, and Mayer rod coating. Dilute solutions are prepared at concentrations that are preferably less than 1%, and more preferably between 0.05% and 0.5%. Suitable solvents or solvent mixtures are those that dissolve the layer material and evaporate at an appropriate rate to form the layer in a timely manner. Residual or trace solvent remaining in the layer should not interfere with subsequent processing steps. For example, suitable solvents for a fluorinated layer material include but are not limited to fluorinated solvents such as Novec® FC770, HFE7200, and HFE7300. The solution is cast onto a suitable substrate such as a porous-layer support and the solvent(s) are evaporated to form the high-diffusion rate layer. The layer is very thin and preferably about 0.01-μm to about 0.5-μm, and more preferably 0.01-μm to 0.1-μm. The layer preferably has a carbon dioxide permeance of at least 5000-GPU at 25° C., more preferably at least 10,000-GPU, and most preferably at least 10 times greater than the gas-separation layer. Permeance, which is pressure normalized flux, is typically reported in gas permeance units or GPU and has units of $10^6 \times cm^3(STP)/cm^2/sec/cmHg$. Permeability is further normalized for thickness and has units of $10^{10} \times cm^3(STP) \times cm/cm^2/sec/cmHg$ and reported in Barrer.

The porous-layer support reinforces the gas-separation and high-diffusion rate layers and helps to strengthen the composite membrane as a whole such that the membrane may be fabricated into more complex geometries such as spiral-wound or hollow-fiber membrane modules. The porous-layer support may be in the form of a flat sheet, hollow fiber, or tube. Suitable materials for a porous-layer support include but are not limited to polyvinylidine fluoride, expanded polytetrafluoroethylene, polyacrylonitrile, polysulfone, and polyethersulfone. The porous-layer support may also comprise an even stronger backing material such as porous non-woven polyester or polypropylene. Porous inorganic substrates such as silica or alumina are also suitable materials for the porous-layer support. Permeate gases should flow relatively unobstructed through the usually much thicker porous-layer support having a preferred porosity that is 40% or greater. The average pore size is preferably less 0.1-μm and more preferably between 0.01 and 0.03-μm.

The thin-film composite membrane may be subjected to a thermal treatment step "annealed" to further improve mechanical durability, long-term permeance and selectivity, and resistance to degradation from contact with liquid water. The ionomer in the gas-separation layer is annealed by heating the composite membrane to near or above the glass transition temperature of the ionomer. The exact glass transition temperature will be dependent on the ionomer composition and the associated counter ion. Generally, annealing temperatures for the preferred ionomers are between 50 and 200° C., and preferably between 75 and 150° C. The composite membrane is preferably heated for 0.1 to 10 minutes, more preferably for 1 to 5 minutes. The appropriate annealing temperature and time should not degrade the other components of the composite membrane.

The thin-film composite membrane is highly useful for the separation of carbon dioxide from compositions comprising a non-hydrophilic gas. A "non-hydrophilic gas" is a gas that has a low solubility in water that is approximately 100-mg/L or less at 1-bar and 20° C. Examples of non-hydrophilic gases include hydrogen ($H_2$, 1.6-mg/L), oxygen ($O_2$, 43-mg/L), nitrogen ($N_2$, 19-mg/L), methane ($CH_4$, 23-mg/L), and ethane ($C_2H_6$, 62-mg/L). The solubility of carbon dioxide for comparison is approximately 1700-mg/L at 1-bar and 20° C. The membrane is exposed to a flowing gaseous feed-composition comprising carbon dioxide and a non-hydrophilic gas. A "driving force" is provided in which the carbon dioxide pressure on the membrane feed-side is higher than on the permeate side. This may be accomplished by applying a vacuum on the membrane permeate-side and may be preferred for the carbon dioxide separation from flue gas due to the lower energy consumption. Separation of carbon dioxide from the gaseous feed-mixture occurs through the membrane producing a membrane permeate-side composition having a higher concentration of carbon dioxide than the feed composition. Separation may also be enhanced by having water vapor in the feed mixture and optionally as a sweep gas on the membrane permeate-side, which functions to further reduce the carbon dioxide concentration.

EXAMPLES

Examples of certain representative embodiments of the invention are as follows. Proportions and percentages are by weight unless otherwise indicated. All units of weight and measure not originally obtained in SI units have been converted to SI units. Unless otherwise indicated, pressure values disclosed are gage pressures (i.e. relative to atmospheric pressure). Certain abbreviations used in the examples are defined by their Chemical Abstracts Names or structures as follows:

| | |
|---|---|
| VF | fluoroethene |
| PPSF | 1,1,2,2-tetrafluoro-2-[(1,2,2-trifluoroethenyl)oxy]-ethanesulfonyl fluoride |
| PDD | 4,5-difluoro-2,2-bis(trifluoromethyl)-1,3-dioxole |
| HFPO dimer peroxide | $CF_3CF_2CF_2OCF(CF_3)C(O)OOC(O)CF(CF_3)OCF_2CF_2CF_3$ |

Example 1

Synthesis and hydrolysis of PDD/VF/PPSF (Feed ratio: 1/2/1.5) terpolymer: Into a 150-mL stainless steel pressure vessel, after argon purging for 5 minutes, were added a magnetic stirring bar, 10.5-g PPSF, 6.1-g PDD, 32-mL Vertrel® XF, 0.6-mL and HFPO dimer peroxide (0.15 M) in Vertrel® XF. The pressure vessel was sealed, initially cooled to 0° C. then charged with 2.3-g of vinyl fluoride gas. The reaction mixture was stirred at room temperature in a water bath overnight. The reaction vessel was brought to ambient atmospheric pressure, opened, and 50 mL of methanol was added to the reaction mixture. The precipitated gel was transferred to a glass dish and dried in a fume hood at ambient temperature to remove the majority of volatile components, and then in a forced air oven at 80° C. for 6 hours to yield 10.7 g of PDD/VF/PPSF terpolymer as a pale color solid. Glass transition temperature (Tg)=55° C.

10.7-g of PDD/VF/PPSF terpolymer synthesized in the above procedure, 200-mL methanol, 3.3-g ammonium carbonate, and a magnetic stirring bar were added to a glass 500 mL round-bottom flask. The reaction mixture was stirred over the weekend at 50-60° C. as the terpolymer dissolved. The methanol was removed by evaporation to isolate the terpolymer. The terpolymer was acid exchanged twice using 100-mL of 2.0-M hydrochloric acid and stirring for 15 minutes. Excess acid was removed by rinsing three times with 100-mL of de-ionized water. The terpolymer was dried in a forced-air oven at 100° C. overnight. The yield of acid-form terpolymer was 10.7-g as a brownish solid having a Tg at 92° C.

Example 2

Membrane fabrication from the PDD/VF/PPSF terpolymer: Substrates comprising a nonporous high-diffusion rate layer were first prepared by ring casting 0.1 wt. % solutions of Teflon® AF 2400 in Novec® FC770 onto asymmetrically porous sheets of either polyacrylonitrile (PAN) or polyvinylidene fluoride (PVDF) microfiltration membrane and drying at ambient temperature. The PAN substrate with the high-diffusion rate layer had a $CO_2$ permeance of 23,000 GPU. The PVDF substrate with the high-diffusion rate layer had a $CO_2$ permeance of 7,900-GPU.

The sulfonic-acid-form PDD/VF/PPSF terpolymer from Example 1 was dissolved at room temperature in isopropanol to make 0.7 and 1.0-wt % solutions. Separate fractions of this solution were stirred with 3 equivalents of ammonium, lithium, sodium, or potassium carbonate to form the corresponding sulfonate salts. The solutions were filtered to remove excess carbonate salt and/or prior to further use (1-μm). The solutions were ring cast onto the high-diffusion rate layer surface of the substrates. The wet substrate was held vertically to drain the excess casting solution and was then dried in an oven at 65° C. for 30 minutes to form the thin-film composite membrane.

Example 3

Membrane fabrication from a commercial sulfonic-acid (or sulfonate) ionomer: Aquivion® D72-25BS dispersion (25-wt %) in water (Solvay, Houston Tex.) and having a 720-g/mole equivalent weight was purchased from Aldrich (Milwaukee Wis.). The dispersion was diluted with isopropanol to make 0.25, 0.50, and 1.0-wt % concentrations. Separate fractions of these dispersion concentrations were stirred with 3 equivalents of ammonium or lithium carbonate to form the corresponding sulfonate salts. The solutions were filtered to remove excess carbonate salt and/or prior to further use (1-μm). The dispersions were ring cast onto the high-diffusion rate layer surface of the PAN or PVDF substrates, as prepared in Example 2. The wet substrate was held vertically to drain the excess casting dispersion and was then dried in an oven at 65° C. for 30 minutes to form the thin-film composite membrane.

Example 4

Gas-separation layer thickness estimation: An estimate of the thickness for the gas-separation layer (GSL) of the composite membranes prepared in Example 3 was calculated from the "wet" substrate dispersion weight, the dispersion percent concentration ([% Dispersion]), the membrane cast-surface area (38.3-cm$^2$), and the ionomer density (ρ), which was reported at 2.06-g/cm$^3$. The GSL thicknesses were calculated from the following equation (1) and the results are shown in Table 1.

$$GSL \; (\mu m) = \frac{\text{"Wet" film (g)} \times [\% \text{ Dispersion}] \times 100}{\rho \; (\text{g/cm}^3) \times 38.3 (\text{cm}^2)} \quad (1)$$

TABLE 1

| [Dispersion] % | "Wet" film (g) | GSL thickness (μm) |
|---|---|---|
| 0.25 | 0.347 | 0.11 |
| 0.50 | 0.426 | 0.27 |

Example 5

Membrane fabrication from a commercial sulfonic-acid (or sulfonate) ionomer: Aquivion® D79-25BS dispersion (25-wt %) in water (Solvay, Houston Tex.), having a 790-g/mole equivalent weight, was purchased from Aldrich (Milwaukee Wis.). The procedure of Example 3 was repeated to a form a 1.0-wt % sulfonic-acid-form dispersion and corresponding composite membrane.

Example 6

Membrane fabrication from a commercial sulfonic-acid (or sulfonate) ionomer: The procedure of Example 3 was repeated to a form a 1.0-wt % sulfonic-acid-form dispersion and corresponding composite membrane using Liquion™ LQ1105 dispersion (5-wt %) in a water/alcohol mixture (Ion Power, New Castle Del.) and having an 1100-g/mole equivalent weight.

Example 7

General procedure for membrane gas-separation measurement: The thin-film composite membranes were separately tested in a stainless-steel cross-flow permeation cell having a 13.85-cm$^2$ active area. Feed gas mixtures were humidified by bubbling through water and fed to the cell at flow rates between 0.8-2.5 standard liters per min. The permeate flow was measured using an acoustic flow meter and concentrations of carbon dioxide and methane in the permeate were measured using a Varian 450 gas chromatograph or Landtec Biogas 5000 meter. Feed flow rates were adjusted such that the stage cut (i.e. flow of permeate relative to feed flow) was maintained below 3.5%. Permeance was calculated for each component independently using the log mean partial pressure difference across the membrane. Selectivity was calculated as the ratio of carbon dioxide permeance to nitrogen or methane permeance.

Example 8

Carbon dioxide separations from nitrogen: Membrane samples from Examples 2, 3, 5, and 6 were tested for CO$_2$/N$_2$ mixed gas separation at ambient temperature (20-25° C.) at a feed pressure of 30-psig and with CO$_2$ concentrations of 40% and 20%. The permeate pressure was close to atmospheric pressure. Table 2 shows high CO$_2$ permeance and selectivity over nitrogen for all tested membranes.

TABLE 2

| Membrane from Example | Cation form | Coating solution conc. | 40% CO$_2$ feed | | 20% CO$_2$ feed | |
|---|---|---|---|---|---|---|
| | | | CO$_2$ Permeance (GPU) | CO$_2$/N$_2$ Selectivity | CO$_2$ Permeance (GPU) | CO$_2$/N$_2$ Selectivity |
| 2 | H$^+$ | 1.0% | 696 | 46.7 | | |
| 2 | NH$_4^+$ | 0.7% | 532 | 50.2 | | |
| 3 | H$^+$ | 1.0% | 1955 | 45.0 | | |
| 5 | H$^+$ | 1.0% | 1473 | 45.6 | | |
| 6 | H$^+$ | 1.0% | 1027 | 36.3 | | |
| 3 | H$^+$ | 0.5% | 2950 | 36.8 | | |
| 3 | Li$^+$ | 0.5% | 1507 | 36.8 | | |
| 3 | NH$_4^+$ | 0.5% | 1750 | 49.7 | | |
| 3 | H$^+$ | 0.25% | 4130 | 32.9 | 5187 | 40.7 |
| 3 | NH$_4^+$ | 0.25% | 2823 | 39.2 | 3376 | 41.2 |

Example 9

Carbon dioxide separations from nitrogen at low feed and permeate pressure: Composite membrane samples from Example 3 were tested for CO$_2$/N$_2$ mixed gas separation at ambient temperature (20-23° C.) at feed pressure of 14.9-16.2-psia and a 20% CO$_2$ concentration. The permeate pressure was 2.5-3.2-psia. Table 3 shows the high permeance and high selectivity for the composite membranes under close to real-world and commercially attractive conditions.

TABLE 3

| Cation form | Coating solution conc. | CO$_2$ Permeance (GPU) | CO$_2$/N$_2$ Selectivity |
|---|---|---|---|
| H$^+$ | 0.25% | 7885 | 37.8 |
| NH$_4^+$ | 0.25% | 7338 | 43.8 |

Example 10

Composite membrane aging performance for carbon dioxide separations from nitrogen: TCM samples from Example 3 were tested initially for CO$_2$/N$_2$ mixed gas separation performance at ambient temperature and at a feed pressure of 30-psig, 40% CO$_2$ feed concentration, and near atmospheric permeate pressure. The composite membranes were tested again after 1 week of exposure to air. Table 4 shows that the permeance for the composite membrane having an ammonium cation in the gas-separation layer may have slightly decreased by 5% but appeared to be more stable than the acid. The high selectivity for both membranes was effectively unchanged.

TABLE 4

| Cation form | Coating solution conc. | Initial Performance | | After 1 week | |
|---|---|---|---|---|---|
| | | CO$_2$ Permeance (GPU) | CO$_2$/N$_2$ Selectivity | CO$_2$ Permeance (GPU) | CO$_2$/N$_2$ Selectivity |
| H$^+$ | 0.25% | 5127 | 31.0 | 2111 | 38.8 |
| NH$_4^+$ | 0.25% | 2823 | 39.3 | 2682 | 39.8 |

Example 11

Carbon dioxide separations from methane: Composite membrane samples from Examples 2 and 3 were tested for $CO_2/CH_4$ mixed gas separation at ambient temperature (20-25° C.) at a feed pressure of 60-psig, 40% $CO_2$ feed concentration, and near atmospheric permeate pressure. Table 5 shows high $CO_2$ permeance and high selectivity over methane for most of the membranes.

TABLE 5

| Membrane from Example | Cation form | Coating solution conc. | $CO_2$ Permeance (GPU) | $CO_2/CH_4$ Selectivity |
|---|---|---|---|---|
| 2 | $H^+$ | 1.0% | 730 | 32.6 |
| 2 | $NH_4^+$ | 0.7% | 347 | 44.0 |
| 2 | $Na^+$ | 1.0% | 777 | 30.8 |
| 2 | $Li^+$ | 1.0% | 744 | 29.9 |
| 2 | $K^+$ | 1.0% | 491 | 46.0 |
| 3 | $H^+$ | 1.0% | 1592 | 25.0 |
| 3 | $NH_4^+$ | 0.5% | 1276 | 32.1 |

Example 12

Carbon dioxide separations from methane at varied feed pressures and $CO_2$ concentrations: Composite membrane samples from Example 2 containing ammonium cations in the gas-separation layer were tested for $CO_2/CH_4$ mixed gas separation at ambient temperature (20-23° C.), feed pressures between 30 and 90 psig, $CO_2$ feed concentrations between 10 and 40%, and near atmospheric permeate pressure. The feed flow was 1000-scc/min.

Table 6 shows high $CO_2$ permeance and higher $CO_2/CH_4$ selectivity at lower feed pressures and lower $CO_2$ concentrations. The composite membranes were directly exposed to manure gas for 1 month and no significant performance change was observed.

TABLE 6

| [$CO_2$] | Feed Pressure (psig) | $CO_2$ permeance (GPU) | $CH_4$ permeance (GPU) | $CO_2/CH_4$ Selectivity |
|---|---|---|---|---|
| 40% | 30 | 595 | 11.8 | 50.3 |
|  | 60 | 399 | 9.6 | 41.7 |
|  | 90 | 327 | 8.0 | 40.7 |
| 20% | 30 | 708 | 14.4 | 49.2 |
|  | 60 | 629 | 14.9 | 42.0 |
|  | 90 | 492 | 12.2 | 40.5 |
| 10% | 30 | 1102 | 15.4 | 71.7 |
|  | 60 | 612 | 12.8 | 47.9 |
|  | 90 | 432 | 11.1 | 38.8 |

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A process for separating a gaseous composition comprising carbon dioxide and a non-hydrophilic gas using a thin-film composite membrane; the process comprising:
   a) providing a thin-film composite membrane comprising:
      i) a porous-layer support;
      ii) a nonporous high-diffusion rate layer that is in direct contact with said porous-layer support; and
      iii) a gas-separation layer that is nonporous and in direct contact with said nonporous high-diffusion rate layer;
   b) exposing a feed side of the thin-film composite membrane to a flowing feed-side composition comprising carbon dioxide, water vapor and a non-hydrophilic gas; and
   c) providing a driving force and producing a permeate-side composition at a permeate side of the thin-film composite membrane having a higher ratio of carbon dioxide to non-hydrophilic gas than the feed-side composition;
   wherein:
   a $CO_2/N_2$ separation selectivity is at least 39.2;
   a $CO_2/CH_4$ separation selectivity is at least 32.1;
   the gas separation layer comprises an ionomer comprising covalently bound ionic groups, and the ionomer is fluoropolymer comprising repeat units A and B in which A is a polymerized derivative of a fluorinated monomer and B comprises hydrophilic ionic groups; and
   the hydrophilic ionic groups are sulfonate groups having an ammonium cation.

2. The process of claim 1 in which the ionomer is selected from the group consisting of: a polytetrafluoroethylene (PTFE) copolymer with side chains comprising a perfluorinated alkyl ether group terminated with the sulfonate group having the ammonium cation; and a hydrolyzed copolymer of perfluoro(2,2-dimethyl-1,3-dioxole) (PDD) with fluoroethene (VF) and 1,1,2,2-tetrafluoro-2-[(1,2,2-trifluoroethenyl)oxy]-ethansulfonyl fluoride (PPSF).

3. The process of claim 1 in which the nonporous high-diffusion-rate layer comprises a copolymer comprising perfluoro(2,2-dimethyl-1,3-dioxole) and tetrafluoroethylene.

4. The process of claim 1 in which the non-hydrophilic gas is selected from the group consisting of: methane, ethane, oxygen, nitrogen, and hydrogen.

5. The process of claim 1, wherein the non-hydrophilic gas is nitrogen.

6. The process of claim 1, wherein the non-hydrophilic gas is methane.

7. The process of claim 1, wherein the fluoropolymer is a polytetrafluoroethylene (PTFE) copolymer with side chains comprising a perfluorinated alkyl ether group terminated with the sulfonate group having the ammonium cation.

8. The process of claim 7, wherein the $CO_2/N_2$ separation selectivity is at least 43.8.

9. The process of claim 1, wherein a $CO_2$ permeance of the thin-film composite membrane decreases by 5% or less when the thin-film composite membrane is exposed to air for one week.

10. The process of claim 1, wherein the fluoropolymer is a terpolymer comprising two different repeat units A.

11. The process of claim 1, wherein the fluoropolymer is a polytetrafluoroethylene (PTFE) terpolymer with side chains comprising a perfluorinated alkyl ether group terminated with the sulfonate group having the ammonium cation.

12. The process of claim 11, wherein the $CO_2/N_2$ separation selectivity is at least 50.2, and the $CO_2/CH_4$ separation selectivity is at least 44.0.

13. The process of claim 11, wherein the fluoropolymer comprises polymerized repeat units A of vinyl fluoride.

* * * * *